(No Model.) 3 Sheets—Sheet 1.
J. THOMSON.
COMPOUND INTERMITTENT WATER METER.
No. 512,849. Patented Jan. 16, 1894.
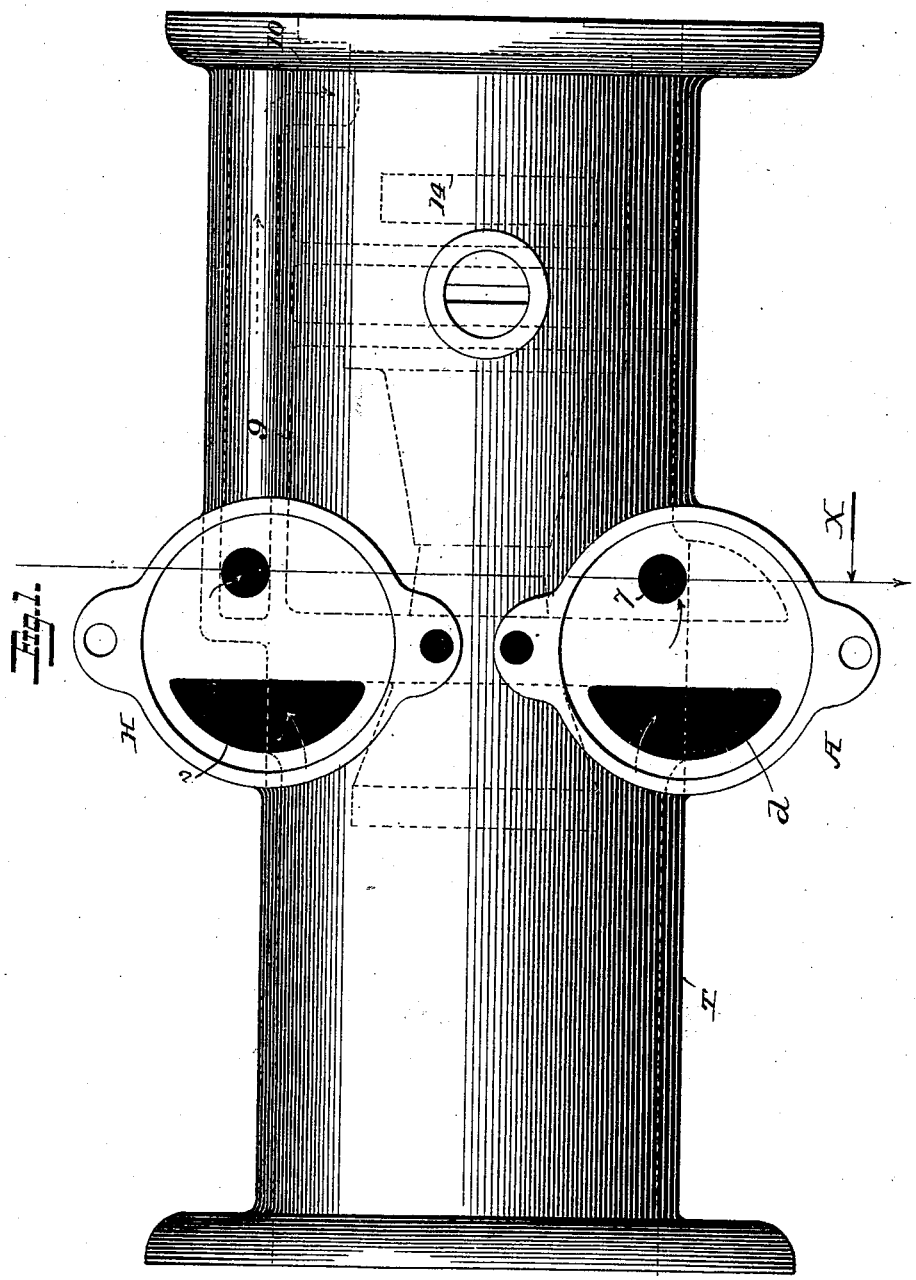

(No Model.) 3 Sheets—Sheet 2.
J. THOMSON.
COMPOUND INTERMITTENT WATER METER.
No. 512,849. Patented Jan. 16, 1894.
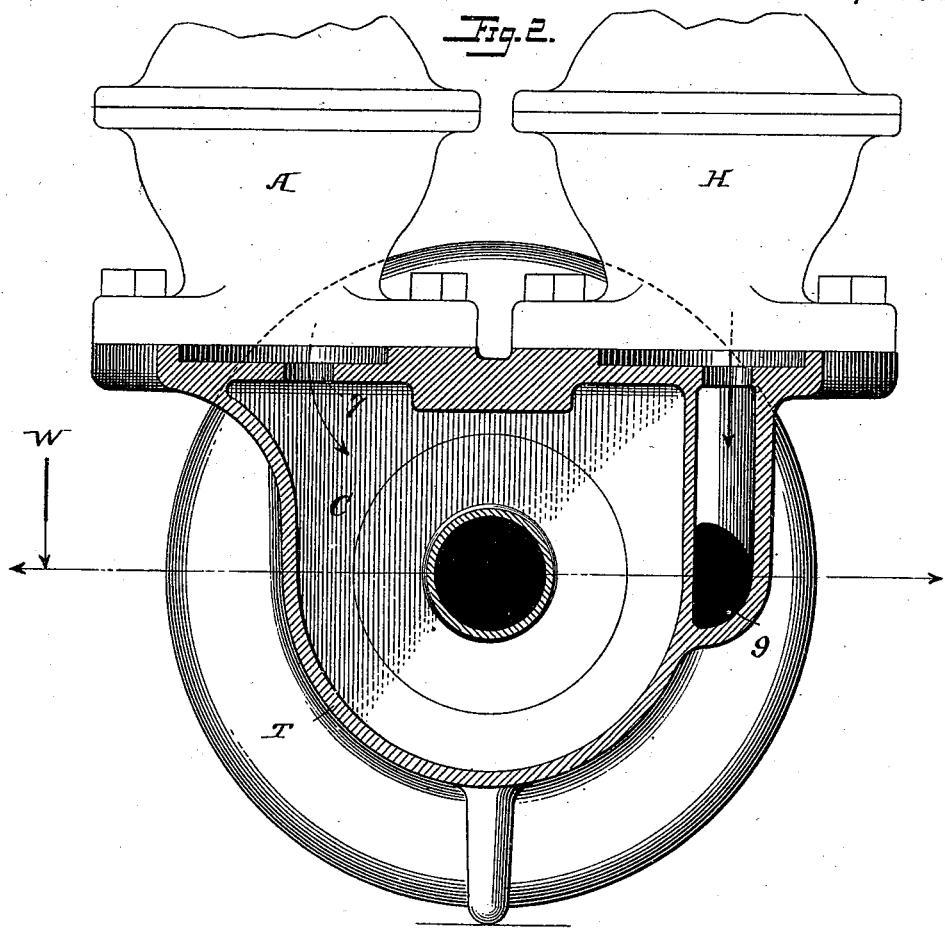
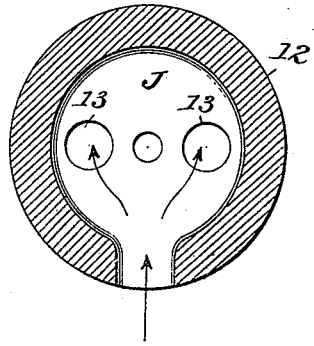
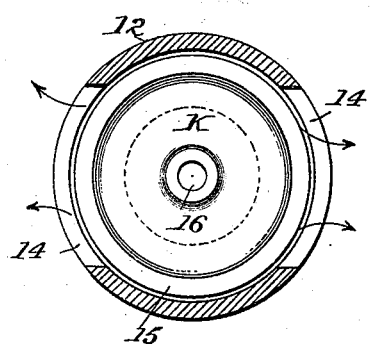

(No Model.) 3 Sheets—Sheet 3.
J. THOMSON.
COMPOUND INTERMITTENT WATER METER.
No. 512,849. Patented Jan. 16, 1894.
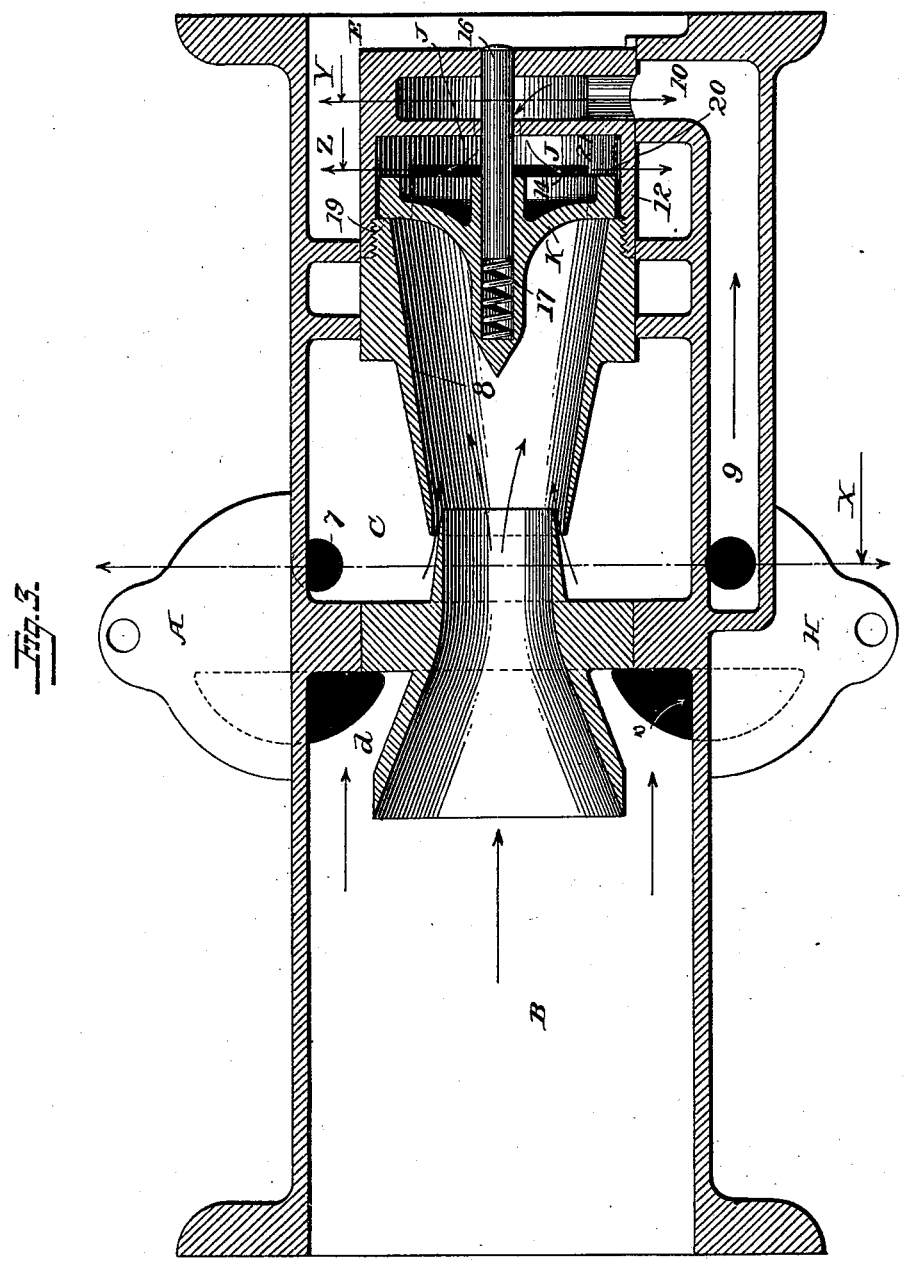

UNITED STATES PATENT OFFICE.

JOHN THOMSON, OF BROOKLYN, NEW YORK, ASSIGNOR TO THE THOMSON HYDRAULIC COMPANY, OF NEWARK, NEW JERSEY.

COMPOUND INTERMITTENT WATER-METER.

SPECIFICATION forming part of Letters Patent No. 512,849, dated January 16, 1894.

Application filed February 11, 1893. Serial No. 461,961. (No model.)

*To all whom it may concern:*

Be it known that I, JOHN THOMSON, a citizen of the United States, residing in Brooklyn, Kings county, New York, have invented certain new and useful Improvements in Compound Intermittent Water-Meters, of which the following is a specification.

The object of this invention is a water meter combining large maximum discharging capacity, and capacity to accurately register the maximum flow and with great sensibility and equally accurate registration at low rates of flow, and my invention consists in providing a meter with a plurality of registering devices in the same circuit, one adapted to register the normal flow, and the other to measure slight flows with means for automatically throwing each registering device into action, whereby the meter of smaller capacity shall operate up to a certain determined maximum rate of flow when the meter of larger capacity shall be put into operation, and the smaller is stopped.

In the drawings, Figure 1, is a partial top plan view; Fig. 2, a partial elevation and transverse section on line X, and Fig. 3, is a central horizontal section on the line W. Fig. 4, is a detail cross section of the valve casing on the line Y, of Fig. 3, and Fig. 5, is a similar view on the line Z.

The type of meter here shown is of the proportional system, in which the registering device A, has its inlet $d$, connected to the inlet chamber B, of the main casing T, and its outlet, through a port 7, to an induction chamber C, both the main flow and the induced flow being discharged as one volume through the outlet diverging tube 8.

The alternate registering device H, may be of any desired capacity and of greater sensibility, although for all practical purposes it may be uniform with its co-partner device A. The inlet port $v$, Fig. 1 of the registering device H, is also connected to the main inlet chamber B, but its outlet is directed to a separate channel, as 9, passing along the main casing and finally directed through an opening 10, to a chamber J, of the valve casing 12, containing the puppet valve K. The flow is directed through ports 13, to the chamber K, and thence through the main ports 14, to the outlet chamber E, of the main casing.

The chamber J, is formed by the walls of the valve-casing and the valve K, which is freely mounted on a spindle 16, has an interposed spring 17. The effect of the spring is to hold the valve face 18, into joint-closure with the end 19, of the diverging nozzle. The periphery of the valve, however, while not coming in contact with the cylindrical wall of the casing, yet affords but limited area for the escape of water past its edge to the ports. Consequently, the principal area for escape from chamber J, is through the portions of the ports that are not lapped by the valve, as shown in Fig. 3; the area of which portions is only that required for the capacity of meter H. Thus with the valve in the position denoted in Fig. 3, there is no escape for water through the nozzle but the flow is quite free and unimpeded through the device H. This position of the parts will continue, (depending upon the resistance afforded by the initial tension of the spring, and the impact of the jets through the ports 13, against the end of the valve,) during which time the entire flow is being transmitted through the meter H. But when the rate of discharge reaches the limit desired for the minimum device, the normal rise of pressure in chamber B, will act to force the valve K, off of its seat; and immediately the valve begins to move, it will act to throttle the discharge from chamber J, and hence to stop the delivery from the device H. The result of thus throttling the flow from chamber J, is to immediately cause an abnormal increase of pressure in the main inlet chamber B, and the valve is therefore quickly thrown entirely over until its face 15, makes contact with the face 21, of the casing, when the escape from the chamber J, is entirely closed and the device H, is stopped. This result can be obtained by a piston valve, but the present construction is less liable to become clogged from dirt, &c. It will be seen that the meter has practically two discharge channels, an automatic pressure valve controlling the discharge port and two registering devices, each discharging into one of the channels.

The advantage of the intermittent action is that the durability of the minimum device is greatly increased as it is not subject to constant operation nor to damage from operation at high rates of discharge, while a more sensitive and accurate registering device may be employed than would be possible if but one registering device were used to register all the water discharged.

While applicable to any type of meter, my improvement is of peculiar value in connection with proportional meters as no material effort need then be made to secure operation of the maximum device at low rates of flow.

It will be evident that more than two registering devices may be employed upon each limb of the circuit and that the same may be connected with the main channel by separate channels.

While I have shown the two registering devices as each arranged to register only a portion of the total flow through the main channel, it will be evident that the maximum device may receive the entire volume of water and the minimum device a portion only, or each device may measure the entire volume passing through the meter at the time such device is in operation.

Without limiting myself to the precise construction and arrangement of parts, I claim—

A meter provided with an ejecting nozzle, a surrounding vacuum chamber, a registering device for measuring the flow to said chamber, an independent discharge channel, and a second registering device for measuring the flow through such channel, substantially as described.

In testimony whereof I have signed my name to this specification in the presence of two subscribing witnesses.

JOHN THOMSON.

Witnesses:
FREDERICK A. LOVECRAFT,
MEYER KRASNER.